Patented Jan. 13, 1942

2,270,118

UNITED STATES PATENT OFFICE 2,270,118

PRODUCTION OF COLORED PHOTOGRAPHIC PICTURES

Béla Gáspár, Hollywood, Calif., assignor to Chromogen, Incorporated, a corporation of Nevada No Drawing. Application December 13, 1937, Serial No. 179,591. In Great Britain December 14, 1936

40 Claims. (Cl. 95—6)

In my earlier patents a process has been described for the production of dyestuff images from diffusely dyed silver images. Thus, for example, according to my U. S. Letters Patent 2,020,775, dated November 12, 1935, the production of such dyestuff images is performed by treating the diffusely dyed silver image with solutions which destroy the dye locally in the presence of the metal deposit of the photographic image. At the same time the silver is partially or totally converted into a silver compound. Individual cases in which the destruction of the dye can be accelerated by the addition of certain substances have been described in my U. S. Patent No. 2,020,775.

It has been found that the effectiveness of the dye destroying solutions described in my U. S. Patent No. 2,020,775 and of the other dye destroying baths which were found to be applicable in the process, can be accelerated by a great number of substances other than those heretofore known. A large number of the new additions yield treating solutions which work in a much more effective manner, e. g. in a much shorter time or in far smaller concentration, than the products previously proposed as accelerators.

In view of the great effectiveness of the additions much smaller amounts of these accelerating substances are sufficient. In many cases the presence of the accelerating compounds in the ratio of 1:100,000 is sufficient to multiply the effectiveness of the dye destroying solution.

As substances which I have found to be strong accelerators the following may be mentioned:
2,3-di-amino-phenazine of the following formula:

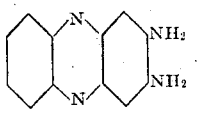

2-oxy-3-amino-phenazine of the following formula:

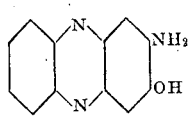

quinoxaline of the following formula:

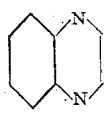

diphenyl-quinoxaline of the following formula

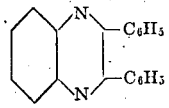

or similar compounds of the general formula

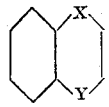

of which the formula

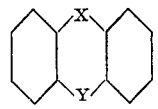

is a more specific example. In this formula X and Y represents groups like nitrogen, sulphur, oxygen, carbonyl C=O, carbimino C=NH and the like. The compounds may be substituted by amino-groups, oxy-groups, alkyl-groups, aryl-groups or other substituents including also sulphonic-groups.

Example 1

A 1% aqueous solution of hydrochloric acid which alone will not work satisfactorily on a layer diffusely colored by Diamine Fast Pink G (a dyestuff furnished by the I. G. Farbenindustrie Akt. Ges.) may be activated by the addition of 0.002%, 2,3-diamino-phenazine.

Example 2

The action of a 2½% aqueous solution of hydrobromic acid on the dyestuff Heliotrope B (Schultz Farbstofftabellen, 1931, 7th edition, vol. 1, No. 494) may be considerably accelerated by the addition of 0.002% of diamino-phenazine. Even the addition of 7 parts of diamino-phenazine to one million parts of a hydrobromic acid solution of 1.66% strength has a distinct accelerating effect on the local destruction of Heliotrope B.

Example 3

For the production of multicolor images a multi-layer material may be used having different dyestuffs incorporated in layers in which different color selection pictures are recorded. The dyestuffs may be for example Diamine Pure Blue FF (Schultz loc. cit. No. 510), Benzo-Light-Yellow 4 GL extra (Schultz loc. cit. No. 308) and Sirius Ruby B (furnished by the I. G. Farbenindustrie Akt. Ges.). The dye-destroying solution consists of 4% aqueous solution of hydrobromic acid which has been activated by the addition of 0.002% of diamino-phenazine.

*Example 4*

A solution containing 70 g. thiocarbamide, 30 g. hydroquinone, 50 g. chrome alum, 5 ccm. sulphuric acid ($d=1.85$) per liter, with the addition of 0.2 g. 2,3-diamino-phenazine is used for treating exposed and developed silver halide layers containing the dyestuff obtained from diazotised ortho-anisidine and resorcinol. A dyestuff image is obtained after 7 minutes treating.

*Example 5*

A solution containing 74 g. potassium bromide and 17½ ccm. sulphuric acid ($d=1.84$) per liter is saturated with 2,3-diphenyl-quinoxaline and then contains less than 0.01 g. per liter of this substance. The solution acts on silver images dyed with the dyestuff obtained from diazotised 4-amino-1-benzoylamino-3-methoxy-6-methyl-benzol and β-naphthol within 25 minutes or on the dyestuff obtained from diazotised o-anisidine and resorcinol within 30 minutes or on the dyestuff obtained from diazotised p-nitraniline and β-naphthol within 60 minutes.

With this dyestuff and with the same treating bath the same result is obtained if, instead of the 2,3-diphenyl-quinoxaline, the 2,3-dimethyl-quinoxaline, the 2-oxy-3-methylquinoxaline or ordinary quinoxaline are used, 2 g. of each accelerator being used per liter. The dyestuffs chosen for the tests are in most cases insoluble azo dyestuffs which in themselves are difficult to bleach out. In using dyestuffs of this sort, the differences are naturally more evident than if dyestuffs are employed which are bleached out in a shorter time in a dyestuff destroying bath without admixture. In using insoluble dyestuffs which are difficultly bleached, the difference is so great that, for instance, the thio-carbamide bath mentioned in Example 4 which, with an admixture of, for instance, 2,3-diamino-phenazine destroys the dyestuffs locally after 7 or 8 minutes of treatment, shows practically no useful effect if the accelerating substance is omitted, even if the time of treatment is doubled.

Mention should, however, be made of the fact that the application of the admixtures has certan advantages even in the case of easily soluble and easily bleaching dyestuffs, such as a shortening of the time of treatment and thereby a decrease of the detrimental effect on the layer.

The results of a large number of compounds which have been tested and found to be useful accelerators are given in the following list which shows the accelerating effect obtained by the addition of various substances to a number of treating baths used in producing dyestuff images from silver images dyed by six different dyestuffs. These dyestuffs are:

A—Pontamine Sky Blue 6 B (Schultz loc. cit. No. 510)
B—Chlorantine Light Green BB Ciba
C—Tuchecht Brillantrot 2 B Ciba
D—Benzolight Red 8 BL (Schultz loc. cit. No. 566)
E—Congo Sky Blue (Schultz loc. cit. No. 513)
F—Chlorantine Fast Orange TRL (Schultz loc. cit. No. 706)

| No. | Catalyst | Accelerating effect on hydrochloric acid 11% | Dyestuff used |
|---|---|---|---|
| 1 | Benzhydrol | ++ | A, B, C |
| 2 | Alphabenzil-dioxime | +++ | A, B, C |
| 3 | Benzophenone-anil | ++++ | A, B |
| 4 | Cyanamide | + | C |
| 5 | Diacetyl-monomethoxime | ++ | A, B, C |
| 6 | Diacetyl-monoxime | ++ | A, B |
| 7 | Dibenzylamine | ++++ | A, B |
| 8 | Diphenyl-piperazine | ++ | A, B |
| 9 | Diphenyl-thiocarbazone | +++ | A, B |
| 10 | Hydrobenzamide | +++ | A, B, C |
| 11 | Methylene-amino-acetonitrile | ++ | A, B |
| 12 | Quinizarin | +++ | A, B |
| 13 | Quinaphthalone | +++ | A, B |
| 14 | 2,2',4,4'-tetramino-5,5'-dimethyl-diphenyl-methane | +++ | A, B |
| 15 | Tetra-ethyl-p-diamino-benzophenone | +++ | A, B |
| 16 | Tetra-ethyl-p-p'-diamino-diphenyl-methane | ++++ | A, B |
| 17 | Benzothio-diazol | ++++ | A, B, C |
| 18 | 2,3-dimethyl-quinoxaline | ++++ | A, B |
| 19 | 2,3-diamino-phenazine | ++++ | A, B, C |
| 20 | 2-oxy-3-amino-phenazine | ++++ | A, B, C |
| 21 | N, N'-di (paraaminophenyl) N, N'-dimethyl-ethylene-diamine | ++++ | A, B |
| 22 | Methyl violet B | +++ | A, B, C |
| 23 | Auramine | ++++ | A, B |
| 24 | Diacetyl-p-phenylene-diamine | +++ | A, B, C |
| 25 | S-diphenylethylene-diamine | +++ | A, B |
| 26 | 2,4-diaminodiphenylamine | ++++ | A, B |
| 27 | Quinizarin sulphonic acid | ++++ | A, B |
| 28 | Sodium indigo sulphonate | ++++ | A, B |
| 29 | 1,2,4-triaminobenzene-trihydrochloride | ++++ | A, B |
| 30 | Tetramethyl-diamino-benzhydrol | ++ | A, B, C |
| 31 | Tetramethyl-p-diamino-benzophenone | ++ | A, B, C |
| 32 | Tetramethyl-p-phenylene-diamine hydrochloride | ++ | A, B, C |
| 33 | Tetramethyl-p-diamino-diphenyl methane | +++ | A, B |
| 34 | N-methyl-quinolone | Hydrobromic acid 5% +++ | A, B |
| 35 | N-methyl-quinolone | Hydrochloric acid 11% +++ | A, B |
| 36 | Acetone-phenylhdrazone | +++ | A, B |
| 37 | Acetone-oxime | + | C |
| 38 | Acridone | ++ | A, B |
| 39 | 6-amino-purine sulphate | ++ | A, B |
| 40 | Amino-pyrine | ++ | A, B, C |
| 41 | Allantoin | ++ | A, B, C |
| 42 | Anthraquinone-betasulphonic acid | ++++++ | A, B |
| 43 | Benzalmethylamine | +++ | A, B, C |
| 44 | Diacetyl-o-phenylendiamine | +++ | A, B |
| 45 | Benzthiazyl hydrazine | +++ | A, B |
| 46 | 2,chlor-4,6-diamino-benzol | ++++ | A, B |
| 47 | Sym. diphenyl-carbazide | ++ | A, B |
| 48 | Anthraquinone | +++ | A, B, C |
| 49 | 2,3-diphenyl-quinoxaline | ++++ | A, B |
| 50 | 1,amino-anthraquinone | ++++ | A, B |
| 51 | 2,amino-anthraquinone | ++++ | A, B |
| 52 | Anthragallol | +++ | A, B |
| 53 | 1, methyl-2-pyridone | +++ | A, B, C |
| 54 | Alizarine-red-S | ++++ | A, B |
| 55 | Alizarine-red-Agfa | ++++ | A, B |
| 56 | Di-hydro-2-hydroxy-quinoxaline | ++++ | A, B |
| 57 | Fuchsine | ++ | A |
| 58 | Anthraquinone-beta-sulphonic acid | Sodium hyposulphite 20 +++ | D |
| 59 | Tetramethyl-p-diamino-benzophenone | Accelerating effect on hydrochloric acid 11% +++ | D |
| 60 | Quinizarine sulphonic acid | Sodium chloride 20% plus hydrochloric acid +++ | E |
| 61 | do. | Magnesium chloride 20% plus hydrochloric acid +++ | F |
| 62 | Dimethylaminostyryl dimethyl-thiazol-N-methyliodide | Hydrochloric acid 11% +++ | A, B |
| 63 | 6,methoxy-pseudocyanine N-ethyl-iodide | +++ | A, B |
| 64 | N-ethyl-6,methoxy-thio-carbocyanine-iodide | +++ | A, B |
| 65 | N-ethyl-benzthioazol-carbocyanine-iodide | +++ | A, B |

| No. | Catalyst | Accelerating effect on hydrochloric acid 11% | Dyestuff used |
|---|---|---|---|
| 66 | Quinone | ++ | A, B, C |
| 67 | Benzalaniline | +++ | C |
| 68 | Hexamethylenetra-mine. | +++ | A, B |
| 69 | Benzalazine | +++ | A, B |
| 70 | p-Toluol-sulphinic acid | + | C |
| 71 | Benzene-1-sulphonic 3-sulphinic acid. | + | C |
| 72 | Naphthalene-1-sulphonic 4-sulphinic acid. | + | C |
| 73 | (3)-nitrostyryl-quinolinium-N-ethyl-ethylsulphonate. | +++ | A, B |
| 74 | (3)-nitrostyryl-benzthiazol-ethyl-sulphonate. | +++ | A, B, |
| 75 | (3)-sulpho-styryl-pseudo-thiohydantoine. | +++ | A, B |
| 76 | Styryl-quinolinium-ethyl-sulphonate. | +++ | A, B |
| 77 | (4)-dimethylamino-styryl-rhodanine. | ++ | A, B |
| 78 | Bis(4-dimethylamino-2-nitro-phenyl)disulphide. | +++ +++ | A, B A, B |

The foregoing list of accelerating compounds embodies the results obtained with catalysts belonging to various classes of compounds. It includes, for example, reducing substances of the general type disclosed in my earlier Patent No. 2,020,775, dated November 12, 1935. In addition, the list includes compounds of the class of reducible substances, the accelerating effect of which was heretofore unknown. The claims of the present application are directed to reducible substances although the general listing of compounds has been set forth to indicate the comparative activity of the various compounds. In the present application, no claim is made to the reducing substances disclosed and claimed in my above-mentioned Patent No. 2,020,775.

The quantity of the added catalyst was 0.2% in the experiments Nos. 1 to 57 and 60 to 69 of the list, whereas 0.8% was used in No. 58 and 0.5% in No. 59. In Nos. 70 to 72 1% of the addition was used. In Nos. 73 to 77 the quantity of the addition was again 0.05%. In many cases far smaller quantities of the catalyst may be used for practical purposes.

As can be seen the new catalysts belong to different chemical groups. They are in most cases organic substances which can be easily hydrated or dehydrated. Compounds, the reduction-products or oxidation-products of which are capable of forming a reversible redox-system, are especially suitable. See, for example, Nos. 26, 33, 57. Furthermore, organic bases which can be easily oxidized may be used. See Nos. 29, 32, 44. In many cases the bases themselves are not especially effective but can be rendered more suitable by the formation of oxidation products by auto-oxidation. The oxidation products of such bases are very suitable catalysts. Heterocyclic bases can also be used. See Nos. 17, 8. In many cases the compounds which are found to be suitable catalysts are characterized by the presence of a =CO group or =CS group, these groups being present in a carbocyclic or heterocyclic nucleus. See No. 53. If the =CO group appears several times in such a compound as is the case in quinone or quinone derivatives the effectiveness is especially good. See Nos. 48, 50, 51, 52, 58, 42, 66.

Aliphatic compounds with =CO groups or =CS groups are also suitable in many cases. See Nos. 15, 31. Here again several of such groups may be present in the molecule. In other cases the effective compounds are characterized by the presence of the group =C=N—, either in a ring system (No. 39) or in an open chain. See Nos. 2, 3, 5, 6, 11, 36, 37, 43. Compounds of the quinone-imide type or indophenols belong to this group of catalysts. Also the compounds containing the —C≡N group shown in many cases an accelerating effect. A large class of accelerators is found in the class of sensitizing or desensitizing dyestuffs. See for example Nos. 62, 63, 64, 65, 73 to 77. The capacity of accelerating appears to be in no direct proportion to the sensitizing properties but on the contrary to be based mainly on the fact that these dyestuffs usually belong to one of the above-mentioned groups of accelerating substances. It may be noted that organic sulpho-compounds containing —S—S—, —S—H or —SO$_2$H groups are also suitable accelerators. The soluble derivatives of vat dyes are found to be also effective as catalysts. The tests described in the above given list of results are only examples of suitable catalysts and dyes and may be regarded as an illustration only of the new process without restriction to the dyes, catalysts or treating solutions used in the examples.

What I claim is:

1. In the process of producing a photographic dyestuff image in a photographic emulsion uniformly dyed by an azo-dye and also comprising a metal image, the step of treating said metal image with a solution containing a substance capable of selectively destroying said azo-dye by reduction in the presence of said metal image, said solution also comprising a small amount of a reducible organic accelerating substance selected from the group of those reducible substances, the reduction products of which are reoxidizable during the treatment of said metal image with said solution to the original reducible substance, the composition of said solution being such that the reduction products of said reducible substance are reoxidizable during the treatment of said metal image and said solution being substantially free of reducing substances capable of being converted into said reducible substance by oxidation.

2. In a process of producing a photographic dyestuff image in a photographic emulsion uniformly dyed by an azo-dye and also comprising a silver image, the step of treating said silver image with a solution comprising a substance which is capable of forming complex silver compounds and which acts to selectively destroy said azo-dye by reduction in the presence of said silver image, said solution also comprising a small amount of a reducible organic accelerating substance selected from the group of those reducible substances, the reduction products of which are reoxidizable during the treatment of said silver image with said solution to the original reducible substance, said solution being such that the reduction products of said reducible substance are reoxidizable during the treatment of said silver image and said solution being substantially free of reducing substances capable of being converted into said reducible organic substance by oxidation.

3. In a process of producing a photographic dyestuff image in a photographic emulsion uniformly dyed by an azo-dye and also comprising a metal image, which comprises the step of treating the said metal image with a solution containing an agent which is non-destructive with respect to the dyestuff, but reacts with the said metal to oxidize it and substantially simultaneously to form a reducing substance which destroys said azo-dye at the points of the metal image, said solution also comprising a reducible organic accelerating substance selected from the group of those reducible substances, the reduction products of which are reoxidizable during the treatment of the metal image with said solution to the original reducible substance, the composition of said solution being such that the reduction products of said reducible substance are reoxidizable during treatment of the metal image and said solution being substantially free of reducing substances capable of being converted into said reducible substance by oxidation.

4. In a process of producing a photographic dyestuff image in a photographic emulsion uniformly dyed by an azo-dye and also comprising a silver image which comprises the step of treating the said silver image with a solution containing an agent which is non-destructive with respect to the dyestuff, but reacts with the said silver image to oxidize it and substantially simultaneously to form a reducing substance which destroys said azo-dye at the points of the silver image, said solution also comprising a reducible organic accelerating substance selected from the group of those reducible substances, the reduction products of which are reoxidizable during the treatment of the silver image with said solution to the original reducible substance, the composition of said solution being such that the reduction products of said reducible substance are reoxidizable during treatment of the silver image and said solution being substantially free of reducing substances capable of being converted into said reducible substance by oxidation.

5. A treating bath for producing a photographic dyestuff image in a photographic emulsion uniformly dyed by an azo-dye and also comprising a metal image, comprising a solution of a substance capable of selectively destroying said azo-dye by reduction in the presence of said metal image, said solution also comprising a small amount of a reducible organic accelerating substance selected from the group of those reducible substances, the reduction products of which are reoxidizable during the treatment of said metal image with said solution to the original reducible substance, the composition of said solution being such that the reduction products of said reducible substance are reoxidizable during the treatment of said metal image and said solution being substantially free of reducing substances capable of being converted into said reducible substance by oxidation.

6. A treating bath for producing a photographic dyestuff image in a photographic emulsion uniformly dyed by an azo-dye and also comprising a silver image, comprising a compound capable of forming complex silver compounds and which acts to selectively destroy said azo-dye by reduction in the presence of said silver image and also a small amount of a reducible organic accelerating substance which is reducible and the reduction products of which are reoxidizable during the production of said image to the original reducible substance, the composition of said bath being such that the reduction products of said reducible substance are reoxidizable during the treatment of said photographic emulsion and said bath being substantially free of reducing substances capable of being converted into said reducible substance by oxidation.

7. A treating bath for producing a photographic dyestuff image in a photographic emulsion uniformly dyed by an azo-dye and also comprising a silver image, comprising a solution of an agent which is non-destructive with respect to the dyestuff, but reacts with the said silver image to oxidize it and substantially simultaneously to form a reducing substance which destroys said azo-dye at the points of the silver image, said solution also comprising a reducible organic accelerating substance which is reducible and the reduction products of which are reoxidizable during the production of said dyestuff image to the original reducible substance, the composition of said bath being such that the reduction products of said reducible substance are reoxidizable during the treatment of said photographic emulsion and said solution being substantially free of reducing substances capable of being converted into said reducible substance by oxidation.

8. In the process of producing a photographic dyestuff image in a photographic emulsion uniformly dyed by an azo-dye and also comprising a silver image, the step of treating said silver image with a solution containing a substance capable of selectively destroying said azo-dye by reduction in the presence of said silver image, said solution also comprising a small amount of a reducible organic accelerating substance selected from the group consisting of unsubstituted or substituted compounds of the following general formula

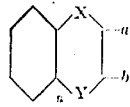

in which X and Y represent a group, selected from the group consisting of N and C=O, and in which $a$ and $b$ represent a residue selected from the group consisting of hydrogen, methyl, phenyl and four-membered carbon-chains forming a condensed ring system, the substituents being selected from the group of substituents consisting of amino-groups, oxy-groups, alkyl-groups, aryl groups and sulphonic groups.

9. A treating bath for producing a photographic dyestuff image in a photographic emulsion uniformly dyed by an azo-dye and also comprising a silver image, comprising a solution of a substance capable of selectively destroying said azo-dye by reduction in the presence of said silver image, said solution also comprising a small amount of a reducible organic accelerating substance which is reducible during the production of said dyestuff image selected from the group consisting of unsubstituted or substituted compounds of the following general formula

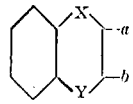

in which X and Y represent a constituent selected from the group consisting of N and C=O and in which $a$ and $b$ represent a residue selected from the group consisting of hydrogen, methyl, phenyl, and four-membered carbon-chains forming a condensed ring system, the substituents being selected from the group of substituents consisting of amino-groups, oxy-groups, alkyl-groups, aryl-groups and sulphonic groups.

10. In the process of producing a photographic dyestuff image in a photographic emulsion uniformly dyed by an azo-dye and also comprising a silver image, the step of treating said silver image with a solution containing a substance capable of selectively destroying said azo-dye by reduction in the presence of said silver image, said solution also comprising a small amount of a reducible phenazine compound capable of being reduced during the treatment of said silver image.

11. A treating bath for producing a photographic dyestuff image in a photographic emulsion uniformly dyed by an azo-dye and also comprising a silver image, comprising a substance capable of selectively destroying said azo-dye by reduction in the presence of said silver image, said bath also comprising a small amount of a phenazine compound which is reducible during the production of said dyestuff image.

12. In a process of producing a photographic dyestuff image in a photographic emulsion uniformly dyed by an azo-dye and also comprising a metal image, the step of treating the said metal image with a solution containing an agent which is non-destructive with respect to the dyestuff, but reacts with the said metal to oxidize it and substantially simultaneously to form a reducing substance which destroys said azo-dye at the points of the metal image and further containing a small amount of a phenazine compound which is reducible during the production of said dyestuff image.

13. A treating bath for producing a photographic dyestuff image in a photographic emulsion uniformly dyed by an azo-dye and also comprising a silver image, comprising a substance which is non-destructive with respect to the dyestuff, but reacts with the silver to oxidize it and substantially simultaneously to form a reducing substance which destroys said azo-dye at the points of the silver image and also comprising a small amount of a phenazine compound which is reducible during the production of the dyestuff image.

14. A process of producing a photographic dyestuff image in a photographic emulsion uniformly dyed by an azo-dye and also comprising a silver image, which comprises the step of treating said silver image with a solution comprising a substance which is capable of forming complex silver compounds and which acts to selectively destroy said azo-dye by reduction in the presence of said silver image and a small amount of a phenazine compound which is reducible during the production of said dyestuff image.

15. A treating bath for producing a photographic dyestuff image in a photographic emulsion uniformly dyed by an azo-dye and also comprising a silver image, comprising a substance capable of forming complex silver compounds and which acts to selectively destroy said azo-dye by reduction in the presence of said silver image and a small amount of a phenazine compound which is reducible during the production of said dyestuff image.

16. A process of producing a photographic dyestuff image in a photographic emulsion uniformly dyed by an azo-dye and also comprising a silver image, which comprises the step of treating said silver image with a solution comprising a substance which is capable of forming complex silver compounds and which acts to selectively destroy said azo-dye by reduction in the presence of said silver image and a small amount of a quinoxaline compound which is reducible during the formation of said dyestuff image.

17. A treating bath for producing a photographic dyestuff image in a photographic emulsion uniformly dyed by an azo-dye and also comprising a silver image, comprising a substance capable of forming complex silver compounds and which acts to selectively destroy said azo-dye by reduction in the presence of said silver image and a small amount of a quinoxaline compound which is reducible during the production of said dyestuff image.

18. In a process for producing a photographic dyestuff image in a photographic emulsion uniformly dyed by an azo-dye and also comprising a metal image, the step of treating the said photographic emulsion with a solution containing an agent which is non-destructive with respect to the dyestuff, but reacts with the said metal to oxidize it and substantially simultaneously to form a reducing substance which destroys said azo-dye at the points of the metal image and further containing a small amount of a quinoxaline compound which is reducible during the production of said dyestuff image.

19. A treating bath for producing a photographic dyestuff image in a photographic emulsion uniformly dyed by an azo-dye and also comprising a silver image comprising a substance capable of selectively destroying said azo-dye by reduction in the presence of said silver image, said bath also comprising a small amount of a quinoxaline compound which is reducible during the production of said dyestuff image.

20. A treating bath for producing a photographic dyestuff image in a photographic emulsion uniformly dyed by an azo-dye and also comprising a silver image comprising thiocarbamide and a small amount of a reducible organic accelerating substance which is reducible and the reduction products of which are reoxidizable during the production of said dyestuff image to the original reducible substance, the composition of said treating bath being such that the reduction products are reoxidizable during the production of said dyestuff image and said treating bath being substantially free of reducing substances capable of being converted into said reducible substance by oxidation.

21. In a process of producing a photographic dyestuff image in a photographic emulsion uniformly dyed by an azo-dye and also comprising a silver image, the step of treating the said silver image with a solution of thiocarbamide and a small amount of a reducible organic accelerating substance selected from the group of those reducible substances, the reduction products of which are reoxidizable during the treatment of said silver image with said solution to the original reducible substance, the composition of said solution being such that the reduction products of said reducible substances are reoxidizable during the treatment of the silver image and said solution being substantially free of reducing substances capable of being converted into said reducible substance by oxidation.

22. A treating bath for producing a photographic dyestuff image in a photographic emulsion uniformly dyed by an azo-dye and also comprising a silver image, comprising a solution of thiocarbamide and a small amount of a reducible organic accelerating substance selected from the group of those reducible substances, the reduction products of which are reoxidizable during the treatment of said silver image with said solution to the original reducible substance, the composition of said solution being such that the reduction products of said reducible substance are reoxidizable during the treatment of said silver image and said solution being substantially free of reducing substances capable of being converted into said reducible substance by oxidation.

23. In a process for producing a photographic dyestuff image in a photographic emulsion uniformly dyed by an azo-dye and also comprising a silver image, the step of treating said silver image with a solution comprising thiocarbamide and a small amount of a phenazine compound which is reducible during the production of said dyestuff image.

24. A treating bath for producing a photographic dyestuff image in a photographic emulsion uniformly dyed by an azo-dye and also comprising a silver image, comprising a solution of thiocarbamide and a small amount of a phenazine compound which is reducible during the production of said dyestuff image.

25. In a process for producing a photographic dyestuff image in a photographic emulsion uniformly dyed by an azo-dye and also comprising a silver image, the step of treating the said emulsion with a solution of hydrohalic acid and a small amount of a reducible organic accelerating substance selected from the group of those reducible substances, the reduction products of which are reoxidizable during the treatment of said silver image with said solution to the original reducible substance, the composition of said solution being such that the reduction products of said reducible substance are reoxidizable during the treatment of said silver image and said solution being substantially free of reducing substances capable of being converted into said reducible substance by oxidation.

26. A treating bath for producing a photographic dyestuff image in a photographic emulsion uniformly dyed by an azo-dye and also comprising a silver image comprising hydrohalic acid and a small amount of a reducible organic accelerating substance which is reducible and the reduction products of which are reoxidizable during the production of said dyestuff image to the original reducible substance, the composition of said treating bath being such that the reduction products are reoxidizable during the production of said dyestuff image and said treating bath being substantially free of reducing substances capable of being converted into said reducible substance by oxidation.

27. In a process of producing a photographic dyestuff image in a photographic emulsion uniformly dyed by an azo-dye and also comprising a silver image, the step of treating said photographic emulsion with a solution containing hydrohalic acid and a small amount of a reducible organic accelerating substance selected from the group consisting of unsubstituted and substituted compounds of the following general formula

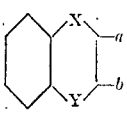

in which X and Y represent a group selected from the group consisting of N and C=0 and in which a and b represent a residue selected from the group consisting of hydrogen, methyl, phenyl, and four-membered carbon-chains forming a condensed ring system, the substituents being selected from the group of substituents consisting of amino-, oxy-, alkyl-, aryl- and sulphonic groups.

28. A treating bath for producing a photographic dyestuff image in a photographic emulsion uniformly dyed by an azo-dye and also comprising a silver image comprising hydrohalic acid and a small amount of a reducible organic accelerating substance which is reducible during the production of said dyestuff image selected from the group consisting of unsubstituted or substituted compounds of the following general formula

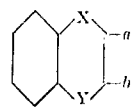

in which X and Y represent a group, selected from the group, consisting of N and C=0, and in which a and b represent a residue selected from the group consisting of hydrogen, methyl, phenyl, and four-membered carbon-chains forming a condensed ring system, the substituents being selected from the group of substituents consisting of amino-groups, oxy groups, alkyl-groups, aryl groups and sulphonic groups.

29. In a process of producing a photographic dyestuff image in a photographic emulsion uniformly dyed by an azo-dye and also comprising a silver image, the step of treating said silver image with a solution comprising hydrohalic acid and a small amount of a phenazine compound which is reducible during the production of said dyestuff image.

30. A treating bath for producing a photographic dyestuff image in a photographic emulsion uniformly dyed by an azo-dye and also comprising a silver image, comprising hydrohalic acid and a small amount of a phenazine compound which is reducible during the production of said dyestuff image.

31. A process for producing a photographic dyestuff image in a photographic emulsion uniformly dyed by an azo-dye and also comprising a silver image, which comprises treating said photographic emulsion with a solution comprising hydrohalic acid and a small amount of a quinoxaline compound which is reducible during the production of said dyestuff image.

32. A treating bath for producing a photographic dyestuff image in a photographic emulsion uniformly dyed with an azo-dye and also comprising a silver image, comprising hydrohalic acid and a small amount of a quinoxaline compound which is reducible during the production of the said dyestuff image.

33. In a process for producing a photographic dyestuff image in a photographic emulsion uniformly dyed by an azo-dye and also comprising a silver image, the step of treating the said silver image with a solution comprising hydrochloric acid and a small amount of a reducible organic accelerating substance selected from the group of those reducible substances, the reduction products of which are reoxidizable during the treatment of said silver image with said solution to the original reducible substance, the composition of said solution being such that the reduction products of said reducible substance are reoxidizable during the treatment of said silver image and said solution being substantially free of reducing substances capable of being converted into said reducible substance by oxidation.

34. A treating bath for producing a photographic dyestuff image in a photographic emulsion uniformly dyed by an azo-dye and also comprising a silver image, comprising hydrochloric acid and a small amount of a reducible organic accelerating substance which is reducible and the reduction products of which are reoxidizable during the production of said dyestuff image to the original reducible substance, the composition of said treating bath being such that the reduction products are reoxidizable during the production of said dyestuff image and said treating bath being substantially free of reducing substances capable of being converted into said reducible substance by oxidation.

35. In a process of producing a photographic dyestuff image in a photographic emulsion uniformly dyed by an azo-dye and also comprising a silver image, the step of treating said photographic emulsion with a solution containing hydrochloric acid and a small amount of a reducible organic accelerating substance selected from the group consisting of unsubstituted and substituted compounds of the following general formula

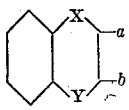

in which X and Y represents a group selected from the group consisting of N and C=0 and in which $a$ and $b$ represent a residue selected from the group consisting of hydrogen, methyl, phenyl, and four-membered carbon-chains forming a condensed ring system, the substituents being selected from the group of substituents consisting of amino-, oxy-, alkyl-, aryl- and sulphonic groups.

36. A treating bath for producing a photographic dyestuff image in a photographic emulsion uniformly dyed by an azo-dye and also comprising a silver image, comprising hydrochloric acid and a small amount of a reducible organic accelerating substance which is reducible during the production of said dyestuff image selected from the group consisting of unsubstituted or substituted compounds of the following general formula

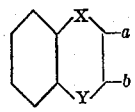

in which X and Y represent a group selected from the group consisting of N and C=0 and in which $a$ and $b$ represent a residue selected from the group consisting of hydrogen, methyl, phenyl, and four-membered carbon-chains forming a condensed ring system, the substituents being selected from the group of substituents consisting of amino-groups, oxy-groups, alkyl-groups, aryl-groups and sulphonic groups.

37. In a process of producing a photographic dyestuff image in a photographic emulsion uniformly dyed by an azo-dye and also comprising a silver image, the step of treating said silver image with a solution comprising hydrochloric acid and a small amount of a phenazine compound which is reducible during the production of said dyestuff image.

38. A treating bath for producing a photographic dyestuff image in a photographic emulsion uniformly dyed by an azo-dye and also comprising a silver image, comprising hydrochloric acid and a small amount of a phenazine compound which is reducible during the production of said dyestuff image.

39. A process for producing a photographic dyestuff image in a photographic emulsion uniformly dyed by an azo-dye and also comprising a silver image which comprises treating said photographic emulsion with a solution comprising hydrochloric acid and a small amount of a quinoxaline compound which is reducible during the production of said dyestuff image.

40. A treating bath for producing a photographic dyestuff image in a photographic emulsion uniformly dyed with an azo-dye and also comprising a silver image, comprising hydrochloric acid and a small amount of a quinoxaline compound which is reducible during the production of the said dyestuff image.

BÉLA GÁSPÁR.